(12) United States Patent
Xu et al.

(10) Patent No.: US 11,125,606 B2
(45) Date of Patent: Sep. 21, 2021

(54) DEVICE AND METHOD FOR DETECTING LEAK RATE OF LEAK

(71) Applicant: CITIC Dicastal CO., LTD., Hebei (CN)

(72) Inventors: Zuo Xu, Qinhuangdao (CN); Guoyuan Xiong, Qinhuangdao (CN); Jinqi Lyu, Qinhuangdao (CN); Zhigao Yin, Qinhuangdao (CN); Hanbao Sun, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 89 days.

(21) Appl. No.: 16/549,409

(22) Filed: Aug. 23, 2019

(65) Prior Publication Data

US 2020/0292376 A1  Sep. 17, 2020

(30) Foreign Application Priority Data

Mar. 14, 2019  (CN) .......................... 201910195062.5

(51) Int. Cl.
*G01G 19/413*  (2006.01)
*G01M 3/26*  (2006.01)
(52) U.S. Cl.
CPC ............ *G01G 19/413* (2013.01); *G01M 3/26* (2013.01)
(58) Field of Classification Search
CPC .................................................... G01M 3/26
USPC .................................................. 73/40–49.8
See application file for complete search history.

(56) References Cited

U.S. PATENT DOCUMENTS

| 2,608,855 | A | * | 9/1952 | Jacobs | G01M 3/229 |
| | | | | | 73/40.7 |
| 3,026,706 | A | * | 3/1962 | Halsell | G01F 1/76 |
| | | | | | 73/1.26 |
| 3,177,704 | A | * | 4/1965 | Stange | G01L 21/04 |
| | | | | | 73/49.3 |
| 3,800,586 | A | * | 4/1974 | Delatorre | G01M 3/3236 |
| | | | | | 73/49.2 |
| 3,946,595 | A | * | 3/1976 | Carlson | B29C 45/34 |
| | | | | | 73/37 |
| 4,364,261 | A | * | 12/1982 | Askwith | G01M 3/26 |
| | | | | | 73/40 |
| 4,455,869 | A | * | 6/1984 | Broussard | E21B 47/003 |
| | | | | | 73/152.01 |
| 4,523,453 | A | * | 6/1985 | Faul | E21B 47/08 |
| | | | | | 73/40.7 |

(Continued)

FOREIGN PATENT DOCUMENTS

CN  101793585 A * 8/2010
JP  02075930 A * 3/1990

OTHER PUBLICATIONS

ESPACENET Machine Translation of CN-101793585 A Which Originally Published On Aug. 4, 2010. (Year: 2010).*

*Primary Examiner* — David A. Rogers
(74) *Attorney, Agent, or Firm* — Syncoda LLC; Feng Ma

(57) ABSTRACT

A device for detecting the leak rate of a leak is employed to realize a detection method for detecting the leak rate of a leak. The device includes a gas storage tank for storing a detection medium, a connecting piece, a detection valve arranged on the connecting piece, a sealed container and a balance for measuring the weight of the sealed container. The device can detect the leak rates of leaks within the range of $1\times10^{-1}\sim1\times10^{-8}$ Pa·m³/s.

10 Claims, 1 Drawing Sheet

(56) References Cited

U.S. PATENT DOCUMENTS

| | | | | |
|---|---|---|---|---|
| 4,624,130 A * | 11/1986 | Faul | | E21B 47/003 73/40.7 |
| 4,715,214 A * | 12/1987 | Tveter | | G01M 3/3236 702/51 |
| 4,896,530 A * | 1/1990 | Lehmann | | G01M 3/3236 73/49.2 |
| 4,920,785 A * | 5/1990 | Etess | | G01M 3/229 73/40.7 |
| 4,929,929 A * | 5/1990 | Romer | | G01M 3/02 340/605 |
| 5,235,845 A * | 8/1993 | Ito | | G01M 3/34 73/40 |
| 5,239,858 A * | 8/1993 | Rogers | | F02M 25/0809 123/518 |
| 5,369,983 A * | 12/1994 | Grenfell | | G01M 3/229 73/40.7 |
| 5,471,867 A * | 12/1995 | Tuma | | G01M 3/2892 73/290 R |
| 6,623,630 B1 * | 9/2003 | Staffler | | F04B 11/0058 210/198.2 |
| 6,698,270 B2 * | 3/2004 | Torsten | | G01M 3/3281 73/1.26 |
| 7,043,966 B2 * | 5/2006 | Kuehn | | G01M 3/3281 73/40 |
| 7,260,981 B2 * | 8/2007 | Lehmann | | G01M 3/3281 73/40 |
| 7,290,440 B2 * | 11/2007 | Gocho | | G01M 3/2815 73/49.2 |
| 7,640,758 B2 * | 1/2010 | Esslinger | | F25B 49/005 62/149 |
| 7,802,462 B2 * | 9/2010 | Standiford | | G01F 25/0046 73/1.16 |
| 8,453,495 B2 * | 6/2013 | Hanson | | G01M 3/26 73/40 |
| 8,534,120 B1 * | 9/2013 | Pavlik | | G01M 3/3263 73/49.2 |
| 9,631,990 B2 * | 4/2017 | Sun | | G01L 3/02 |
| 10,107,711 B2 * | 10/2018 | Balke | | G01M 3/2815 |
| 10,466,136 B2 * | 11/2019 | Zhou | | G01M 3/26 |
| 2003/0007543 A1 * | 1/2003 | Grenfell | | G01M 3/20 374/57 |
| 2003/0173272 A1 * | 9/2003 | Staffler | | G01N 30/36 210/87 |
| 2004/0159143 A1 * | 8/2004 | Bromley | | G01M 3/3245 73/40 |
| 2011/0048111 A1 * | 3/2011 | Vontell | | G01M 3/226 73/40.7 |
| 2012/0291457 A1 * | 11/2012 | Brown | | G01M 3/3227 62/77 |
| 2016/0146681 A1 * | 5/2016 | Sun | | G01M 13/005 73/862.191 |
| 2016/0223425 A1 * | 8/2016 | Liu | | G01M 3/329 |
| 2018/0038880 A1 * | 2/2018 | Stering | | G01N 35/00623 |
| 2019/0145846 A1 * | 5/2019 | Valles | | F01M 1/20 73/114.57 |

\* cited by examiner

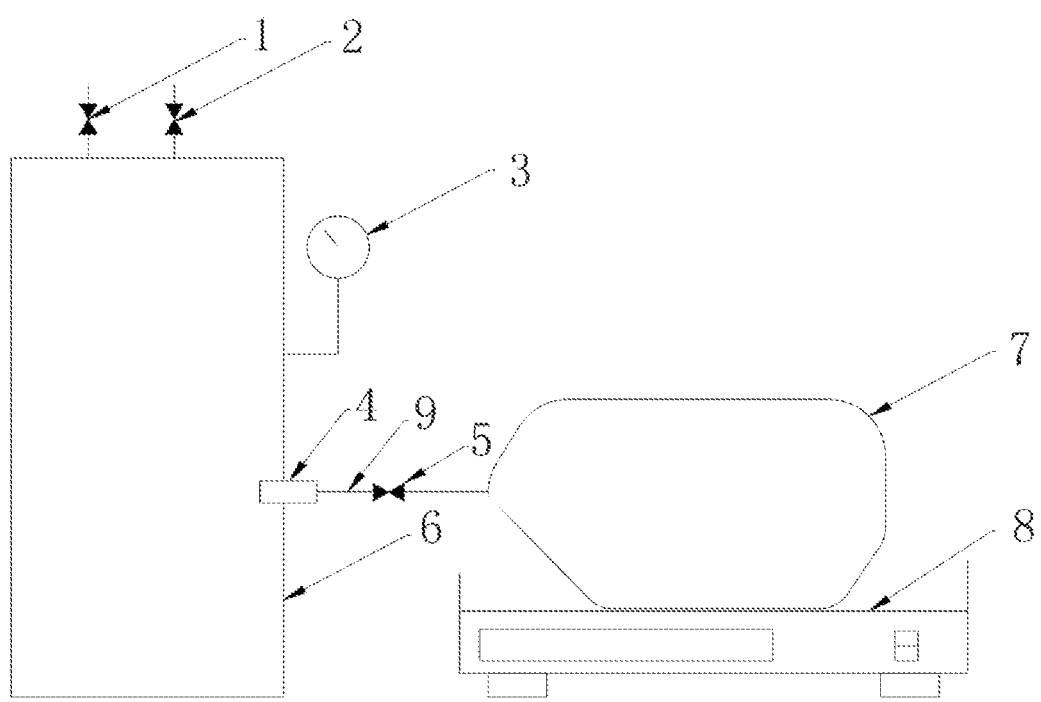

DEVICE AND METHOD FOR DETECTING LEAK RATE OF LEAK

CROSS-REFERENCE TO RELATED APPLICATIONS

The present application claims benefit of Chinese Application No. 201910195062.5, filed on Mar. 14, 2019, the disclosure of which is hereby incorporated by reference in its entirety.

BACKGROUND

Leak is a tool mainly used for examining the airtightness of an airtight system. A device for detecting the leak rate of a leak is a device specially used for detecting the leak rate of a leak, and belongs to the technical field of detection. However, the existing commonly used devices for detecting leak rates of leaks, such as helium mass spectrometer leak detectors, are complicated in structure and expensive in price, thus are commonly used in the field of aerospace and cannot be widely applied.

Therefore, there is a need for a device and method for detecting the leak rate of a leak which are easy to operate and low in cost to solve the general problems in detection of the leak rate of a leak.

SUMMARY

The present disclosure relates to the technical field of detection, in particular to a device and method for detecting the leak rate of a leak.

The present disclosure aims to provide a device for detecting the leak rate of a leak which can meet the needs of detection of leak rates of leaks in general. The present disclosure also provides a method for detecting the leak rate of a leak which is convenient to operate and has higher efficiency.

In order to achieve the above purpose, the technical solutions of the embodiments of the present disclosure are realized as follows:

in one aspect of the present disclosure, a device for detecting the leak rate of a leak is provided, and the device includes a gas storage tank for storing a detection medium, a connecting piece, a detection valve arranged on the connecting piece, a sealed container and a balance for measuring the weight of the sealed container, in which the gas storage tank is provided with a connecting port for being connected with the leak to be detected, one end of the connecting piece is connected with the sealed container, the other end of the connecting piece is used for being connected with the leak to be detected, and the sealed container is placed on the balance;

and when the leak to be detected is connected with the gas storage tank and the connecting piece, and the detection valve is opened, the gas storage tank, the leak to be detected and the connecting piece are in fluid communication with the sealed container.

According to one embodiment, the detection medium in the gas storage tank may be a mixed gas of 21% oxygen and 79% nitrogen.

According to one embodiment, the air pressure inside the sealed container may be kept constant.

According to one embodiment, the sealed container may be made of latex.

According to one embodiment, the device may further include a control unit and a timer, and the control unit is used for opening the detection valve and starting the timer, and closing the detection valve and stopping the timer after a preset period of time.

According to one embodiment, the device may further include a calculation unit, and the calculation unit is used for calculating the leak rate of the leak through the weight, measured by the balance, of the sealed container when the detection valve is closed.

According to one embodiment, the device may further include thermostatic equipment, and the thermostatic equipment enables the leak to be detected, the connecting piece and the sealed container to be in a constant-temperature environment.

In another aspect of the present disclosure, a method for detecting the leak rate of the leak is provided, the method provided by the present disclosure is performed using the above device for detecting the leak rate of the leak, and the method includes:

injecting the detection medium into the gas storage tank;

opening the detection valve on the connecting piece to enable the detection medium in the gas storage tank to sequentially pass through the leak to be detected, the connecting piece and the sealed container;

measuring the initial weight $m_0$ of the sealed container containing gas by the balance;

measuring the final weight $m_t$ of the sealed container containing gas at time t by the balance; and calculating the leak rate $Q_{PV}$ of the leak by the following formula:

$$Q_{PV} = p_{atm} \times \frac{\frac{m_t - m_c}{\rho} - \frac{m_0 - m_c}{\rho}}{t - 0} \times \frac{(a + T_0)}{T_0}$$

in which $p_{atm}$ is the ambient atmospheric pressure, a(° C.) is the ambient temperature of the device, $T_0$=273.15 K, $m_c$ is the weight of the sealed container itself when it does not contain gas, and $\rho$ is the density value of the detection medium.

According to one embodiment, the method may further include: enabling the pressure in the gas storage tank to be always greater than the pressure in the latex sealed container.

According to one embodiment, the method may further include: maintaining the pressure in the gas storage tank at 0.2 MPa±0.01 MPa.

By using the device and method for detecting the leak rate of the leak in the present disclosure, a device structure can be easily built through the simple detection device, and operation is convenient, thereby easily solving the problems of high price and small application range of the existing leak rate detection devices. The detection method of the present disclosure can obviously reduce the limitation brought by the temperature and pressure of the operating environment. According to one embodiment, through the combination of devices, detection of leaks of different leak rates can be realized.

BRIEF DESCRIPTION OF DRAWINGS

FIG. 1 is a structural schematic diagram of a device for detecting the leak rate of the leak according to an embodiment of the present disclosure.

DETAILED DESCRIPTION

The present disclosure will be described in further detail below with reference to the accompanying drawings and specific embodiments. It should be understood that the following detailed description is only for the purpose of illustrating the present disclosure and is not intended to limit the scope of the present disclosure.

The present disclosure provides a device for detecting the leak rate of a leak. FIG. 1 is a schematic diagram of a device for detecting the leak rate of a leak according to Embodiment 1 of the present disclosure. As shown in FIG. 1, the device for detecting the leak rate of the leak includes:

a gas storage tank 6 for storing a detection medium, a connecting piece 9, a detection valve 5 arranged on the connecting piece, a sealed container 7 and a balance 8 for measuring the weight of the sealed container.

The gas storage tank 6 is provided with a connecting port for being connected with the leak to be detected 4, one end of the connecting piece 9 is connected with the sealed container 7, the other end of the connecting piece 9 is used for being connected with the leak to be detected 4, and the sealed container 7 is placed on the balance 8; and the leak rate of the leak 4 is generally $1 \times 10^{-1} \sim 1 \times 10^{-8}$ Pa·m³/s, and the device for detecting the leak rate of the leak can realize detection within the leak rate range.

When the leak to be detected 4 is connected with the gas storage tank 6 and the connecting piece 9, and the detection valve 5 is opened, the gas storage tank 6, the leak to be detected 4 and the connecting piece 9 are in fluid communication with the sealed container 7.

According to a specific embodiment, the detection medium in the gas storage tank 6 is a mixed gas of oxygen and nitrogen. Preferably, the volume proportions of oxygen and nitrogen are 21% and 79% respectively. The volume proportions of oxygen and nitrogen can also be selected such that the density of the mixed gas is equal to the density of the ambient air around the sealed container 7.

According to a specific embodiment, the air pressure inside the sealed container 7 is kept constant. Preferably, the sealed container 7 is made of a deformable material such as latex.

According to a specific embodiment, the device for detecting the leak rate of the leak further includes a control unit and a timer, and the control unit is used for opening the detection valve and starting the timer, and closing the detection valve and stopping the timer after a preset period of time. Alternatively, the device for detecting the leak rate of the leak and the timer may be separately arranged.

According to a specific embodiment, the device for detecting the leak rate of the leak further includes a calculation unit, and the calculation unit is used for calculating the leak rate of the leak through the weight, measured by the balance, of the sealed container when the detection valve is closed. Alternatively, the device for detecting the leak rate of the leak and the calculation unit may be separately arranged.

According to a specific embodiment, the device for detecting the leak rate of the leak further includes thermostatic equipment, and the thermostatic equipment enables the leak to be detected, the connecting piece and the sealed container to be in a constant-temperature environment. The thermostatic equipment may be, for example, a chamber containing the entire device for detecting the leak rate of the leak. Preferably, the ambient temperature is maintained at room temperature of 23° C. 0.5° C.

The method for detecting the leak rate of a leak in the present disclosure will now be described in detail with reference to FIG. 1. The method includes:

injecting the detection medium into the gas storage tank 6;

opening the detection valve 5 on the connecting piece to enable the detection medium in the gas storage tank 6 to sequentially pass through the leak to be detected 4, the connecting piece 9 and the sealed container 7;

measuring the initial weight $m_0$ of the sealed container 7 containing gas by the balance 8;

measuring the final weight $m_t$ of the sealed container 7 containing gas at time t by the balance 8; and under a temperature of 23° C.±0.5° C. and an atmospheric pressure of $p_{atm}$, calculating the leak rate $Q_{PV}$ of the leak 4 by the following formula:

$$Q_{PV} = p_{atm} \times \frac{\frac{m_t - m_c}{\rho} - \frac{m_0 - m_c}{\rho}}{t - 0}$$

in which $p_{atm}$ is the ambient atmospheric pressure, $m_c$ is the weight of the sealed container 7 itself when it does not contain gas, and $\rho$ is the density value of the detection medium.

According to the thermodynamic formula, the molar leak rate $Q_{mol}$ of the mixed gas can be obtained, namely:

$$Q_{mol} = \frac{Q_{PV}}{RT} \text{mol} \cdot s^{-1}$$

in which R is 8.3145 J·mol⁻¹·K⁻¹.

Then the relationship between the leak rate $Q_{PV}$(t) at any time and any temperature a(° C.) is:

$$Q_{PV}(t) = Q_{mol}(t) \cdot R \cdot (a + T_0)$$
$$= p_{atm} \times \frac{\Delta v}{\Delta t} \times \frac{(a + T_0)}{T_0}$$

in which $T_0$=273.15 K.

According to a specific embodiment, the method further includes: enabling the pressure in the gas storage tank 6 to be always greater than the pressure in the latex sealed container 7. Preferably, the pressure in the gas storage tank 6 is maintained at 0.2 MPa±0.01 MPa.

Embodiment 1

The sealed container 7 made of latex (hereinafter referred to as latex sealed container 7) is injected with 21%, by volume, of oxygen and 79%, by volume, of nitrogen in advance, and is stabilized at one atmospheric pressure, namely 0.1 MPa.

An oxygen source valve 1 and a nitrogen source valve 2 are opened to fill the gas storage tank 6 with 21% oxygen and 79% nitrogen, till the pressure value of a pressure gauge is stable at 0.2 MPa, and the valve 5 is closed during the gas filling process.

When the mixed gas is fully mixed, the gas storage tank 6 is left standing for 1 hour, and at this point, the device for detecting the leak rate of the leak is kept in a constant-temperature environment, and the temperature is controlled at 23° C.±0.5° C.; meanwhile, the precision balance 8 is turned on for preheating.

After 1 hour, the latex sealed container 7 is placed on the precision balance 8, and the atmospheric pressure $p_{atm}$ in the detection environment is recorded at the same time. The valve 5 is opened so that the gas storage tank 6, the leak to be detected 4 and the connecting piece 9 are in fluid communication with the latex sealed container 7.

As inflation progresses, the pressure of the gas storage tank 6 is kept at 0.2 MPa+/−0.01 MPa by controlling the rates of the oxygen source valve 1 and the nitrogen source valve 2.

The mass $m_0$ of the latex sealed container at the initial time is measured, the mass m24 of the latex sealed container 24 hours after operation starts is recorded, and the ambient temperature a and the atmospheric pressure $p_{atm}$ are recorded respectively to obtain $Q_{PV1(24\ h)}$.

Operation is performed for another two 24 hours, and $Q_{PV2\ (24\ h)}$ and $Q_{PV3\ (24\ h)}$ are recorded to obtain an average leak rate $$Q_{PV} = \frac{Q_{PV1} + Q_{PV2} + Q_{PV3}}{3}$$

as the leak rate value of the leak.

The device for detecting the leak rate of leak in Embodiment 1 of the present disclosure is adopted to detect the leak rates of 100 leaks. Compared with other similar devices, the results show that the error between the detection results of 98% or above of 100 leaks and the detection results with other similar devices is within +/−5%, so the detection needs can be completely met.

Embodiment 2

As described in Embodiment 1, detection parameters can be determined according to the detection environment and detection requirements. Generally, the ambient temperature is set at 23° C.±0.5° C., the detection operation time is set as 24 hours, the number of detection times is 3-5, and the average value of detection results is used; the rated pressure of the gas storage tank is 0.2 MPa±0.01 MPa; and the detection gas is a mixed gas including, by volume, 79% of nitrogen and 21% of oxygen.

Through the combination of the above test devices, a simple device can be used to detect the leaks of different leak rates while ensuring the accuracy of detection.

The above are only specific embodiments of the present disclosure, but the scope of protection of the present disclosure is not limited thereto. Any person skilled in the art can easily think of changes or substitutions within the technical scope disclosed by the present disclosure, and these changes or substitutions should be covered within the scope of protection of the present disclosure. Therefore, the scope of protection of the present disclosure should be based on that of the claims.

The invention claimed is:

1. A device for detecting a leak rate of a leak, wherein the device comprises a gas storage tank for storing a detection medium, a connecting piece, a detection valve arranged on the connecting piece, a sealed container and a balance for measuring a weight of the sealed container, wherein the gas storage tank is provided with a connecting port for being connected with the leak to be detected, one end of the connecting piece is connected with the sealed container, other end of the connecting piece is used for being connected with the leak to be detected, and the sealed container is placed on the balance;

and when the leak to be detected is connected with the gas storage tank and the connecting piece, and the detection valve is opened, the gas storage tank, the leak to be detected and the connecting piece are in fluid communication with the sealed container.

2. The device according to claim 1, wherein the detection medium in the gas storage tank is a mixed gas of 21% oxygen and 79% nitrogen.

3. The device according to claim 2, wherein before the detection valve is opened, an air pressure inside the sealed container is kept constant.

4. The device according to claim 2, wherein the device further comprises a control unit and a timer, and the control unit is used for opening the detection valve and starting the timer, and closing the detection valve and stopping the timer after a preset period of time.

5. The device according to claim 2, wherein the device further comprises a calculation unit, and the calculation unit is used for calculating the leak rate of the leak using the weight, measured by the balance, of the sealed container when the detection valve is closed.

6. The device according to claim 1, wherein before the detection valve is opened, an air pressure inside the sealed container is kept constant.

7. The device according to claim 6, wherein the sealed container is made of latex.

8. The device according to claim 1, wherein the device further comprises a control unit and a timer, and the control unit is used for opening the detection valve and starting the timer, and closing the detection valve and stopping the timer after a preset period of time.

9. The device according to claim 1, wherein the device further comprises a calculation unit, and the calculation unit is used for calculating the leak rate of the leak using the weight, measured by the balance, of the sealed container when the detection valve is closed.

10. The device according to claim 1, wherein the device further comprises thermostatic equipment, and the thermostatic equipment enables the leak to be detected, the connecting piece and the sealed container to be in a constant-temperature environment.

* * * * *